2,914,494
RESINOUS PRODUCTS

David A. Feigley, Jr., and John A. Parker, Lancaster Township, Lancaster County, Pa., assignors to Armstrong Cork Company, Lancaster, Pa., a corporation of Pennsylvania No Drawing. Application October 25, 1955
Serial No. 542,755

11 Claims. (Cl. 260—9)

This invention relates generally to resinous products, and more particularly to water-soluble thermosetting polymers. Still more particularly, it relates to the polymeric reaction product of an alpha beta unsaturated aldehyde and a reducing sugar. It also relates to the thermoset product produced by curing the above-mentioned water-soluble product. This application is a continuation-in-part of copending application Serial No. 513,154, now abandoned.

It is the primary object of the present invention to present a new resinous product. It is a further object to present an economical resin capable of curing to the thermoset condition without the need of curing catalysts. A still further object is to present a resinous water-soluble thermosetting composition which does not pass through a tacky stage during the curing cycle.

To this end, the invention contemplates the polymeric reaction product of an alpha beta unsaturated aldehyde and a reducing sugar. The reaction product is formed by heating a mixture comprising an alpha beta unsaturated aldehyde and a reducing sugar under acidic conditions in the presence of water.

The alpha beta unsaturated aldehyde contemplated for use in the present invention may be either acrolein itself or one of the substituted acroleins. It will be appreciated that acrolein may be substituted either in the alpha or the beta position by various substituents such as alkyl and aryl groups. In each case, the basic aldehydic acrolein structure is preserved. Thus, the term "an acrolein" or "the acrolein" as used herein is intended to include acrolein itself and the various substituted acroleins, all of which may be generally defined as alpha beta unsaturated aldehydes.

The reducing sugars which form the other ingredients of the present polymeric reaction product are those reducing sugars known in the art. As examples of reducing sugars, there may be mentioned dextrose (glucose), fructose (levulose), mannose, lactose, galactose, and mixtures of reducing sugars such as are found in invert sugar. This list is not exclusive, since various of the mono- or di-saccharides which reduce Fehling's solution are suitable in the present invention. Nonreducing sugars will not produce the resin of the present invention directly. However, many of the polysaccharides, for example, sucrose, may readily be converted to reducing sugars by treatment with acid at elevated temperature. Thus, a nonreducing sugar may be converted to a reducing sugar possessing the free aldehyde or keto groups which are not in glucoside combination with other molecules under the preferred reaction conditions of the present invention. Apparently the free aldehyde or keto group in the reducing sugar molecule activates the hydroxyl groups on the same molecule sufficiently to allow the participation of the reducing sugar in a resin-forming reaction with an acrolein.

The amount of the acrolein to be used should be approximately 1 to 1 on an equivalent basis. Among the reducing sugars, the equivalent basis will vary according to the number of hydroxyl groups in the sugar molecule. Generally speaking, the functionality of the hexoses sugar molecules will be one less than the number of hydroxyl groups in that molecule for the present reaction. Thus, for a reducing sugar such as dextrose and fructose containing five hydroxyl groups, the functionality will be 4. Since the functionality of the acrolein in this reaction appears to be 3, it can be seen that 4/3 moles of the acrolein are needed for every mole of a hexose such as dextrose or fructose. In any case, all the reducing sugars contain sufficient functionalities to participate in the present reaction.

The relative amounts may be varied somewhat from the precise equivalent amounts, but the variation should not be too great to produce a useful resin. An excess of acrolein produces an oxygen-sensitive sticky viscous material similar to tar, but containing the desired resin. An excess of reducing sugar produces a mass containing excess sugar which interferes with the properties desired in the resin. Thus, two moles of acrolein itself reacted with one mole of dextrose will produce the oxygen-sensitive tar and one mole of acrolein itself reacted with one mole of dextrose produces a mass containing unreacted sugar. The ratio of dextrose or other reducing sugar having a functionality of 4 to acrolein will generally vary from about 1 to about 1.80 moles of acrolein per 1 mole of dextrose in a pure water system. This range yields excellent polymeric materials. The reaction of the acrolein with many sugar mixtures follows the same course, since the sugar mixture often contains different sugars possessing precisely the same equivalency. For example, invert sugar is a 50:50 mixture of dextrose:fructose, both of which possess a functionality of 4 in the reaction of the present invention.

The reaction of the present invention may be carried out by admixing the requisite quantities of an acrolein and a reducing sugar in an aqueous medium and heating to an elevated temperature under acidic conditions. It has been found necessary to include water in the reaction medium. For instance, if an attempt is made to react acrolein itself with dextrose in an anhydrous medium such as dioxane, no reaction between the acrolein and the dextrose will occur; there will be formed nothing more than small amounts of acrolein polymer. The aqueous medium is apparently essential in order that the acrolein may react with the reducing sugar. The reducing sugars are all soluble in water. However, all the acroleins are not soluble in water. Thus, where certain of the relatively water-insoluble acroleins are utilized in the present reaction, it is desirable to use, in addition to water, still another solvent, preferably miscible with water, in order to aid in the contact between the acrolein and the sugar. The polarity of the aqueous medium is affected by the use of additional nonaqueous solvents. Where acrolein itself or methacrolein (2-methyl propenal) is used, no solvent other than water is needed, since both of these acroleins are themselves soluble in water. Where crotonaldehyde (2-butenal) is used, the reaction may be expedited by adding a water-miscible solvent, nonreactive with the acrolein, such as dioxane, to the aqueous medium in order to enhance contact between the crotonaldehyde and the reducing sugar. Similarly, when cinnamaldehyde (3-phenyl propenal) is used, the reaction is expedited by the use of similar additional solvent, since the cinnamaldehyde itself is not appreciably soluble in water. Tiglaldehyde (2-methyl-2-butenal) is sufficiently soluble in water for the reaction to proceed, but nevertheless the reaction may be expedited by the use of additional solvent. Furacrolein (3-[2 furyl] propenal) will also call for the addition of solvent. Alpha-ethyl-beta-propyl acrolein (2-ethyl-2-hexenal) will need additional solvent. In each case, therefore, it is necessary that the acrolein and the reducing sugar be rendered mutually soluble in an aqueous system.

It is preferred that the acrolein contain a polymerization inhibitor in order that the yields may be enhanced. This works no hardship, since acrolein as an item of commerce always has a polymerization inhibitor therein. Preferably, the polymerization inhibitor is hydroquinone, but it may also be quinone, benzoquinone, picric acid, tertiary butyl catechol, trinitrobenzene, and pyrogallol. These inhibitors are present to the extent of less than about 1% by weight and more than about 0.025% by weight; preferably the amount should be about 0.5%.

As mentioned earlier, the reaction preferably proceeds under acidic conditions. It is preferred that the pH of the reaction medium be in the range of about 1 to about 3, with the optimum pH being about 1.8, where fairly strong acid conditions are used. Acids used to achieve this pH range may be oxalic, citric, or even small amounts of the inorganic acids such as sulfuric acid. It is generally desirable to make the medium as acidic as possible to promote the reaction, yet not so acidic as to destroy the acrolein or the sugar. Modification of the aqueous system with solvents which affect the ionic strength may require the addition of more of the acrolein or more catalyst to achieve the same result. Catalyst other than the acidic catalysts described may be operable by a different mechanism.

The actual reaction is carried out in simple fashion. The selected acrolein, the reducing sugar, the water, the catalyst, and the additional solvent, if any is needed, are simply admixed and heated to reflux. The reflux temperature will generally be determined by the boiling point of the particular acrolein used. In the reaction of acrolein itself with dextrose, the reflux temperature will be in the range of about 50°–60° C. These conditions should be maintained until the acrolein has substantially all condensed with the sugar. In the case of acrolein itself and dextrose, this takes about 4 hours. Thereafter, the temperature of the reaction mixture may be raised an additional 15°–35° C., and those conditions maintained for an additional period of time necessary to form the polymer. In the case of acrolein itself and dextrose, this will generally be about 12–24 hours. Elevated pressures may be used to shorten the reaction time, and an inert atmosphere may be used to minimize the discoloring effects of oxygen.

On completion of the reaction, the excess water and additional solvent, if any, may be distilled off; vacuum may be used if desired. When most of the water has been removed, the hot resin may be poured out in pans to harden. Subsequently, it may be ground or melted to be used as desired.

Where no solvent other than water is used, it is preferred that the final reaction mixture before heating be about 50% water. The precise amount of water may vary considerably, since there need be present only that amount of water needed to dissolve sufficient acrolein and sugar to allow the reaction to proceed. Where an additional solvent such as dioxane or the like is used, the amounts of water and additional solvent in relation to the amounts of the acrolein and the reducing sugar may be varied in similar manner. Since the water and other solvent are to be removed once the condensation reaction is complete, it is desirable for economical reasons to keep the amount of water as low as is consistent with the obtaining of a good reaction product.

The resin obtained by the above-described process is a thermosetting resin which cures easily without a catalyst with the evolution of water. The resin is of a light amber or golden yellow color; the color may be lightened by carrying out the polymerization reaction under an inert atmosphere such as nitrogen, as mentioned earlier. Resin color is also effected by the relative amount of the acrolein used and by the pH of the reaction medium. The higher the relative amount of acrolein and the lower the pH, the darker the color. Before curing, the resin is hard, inflexible, and hygroscopic. It may be plasticized with known plasticizers, for example glycerine, diethylene glycol, and similar glycols. It may also be temporarily plasticized by water by a simple soaking process after curing. The resin is compatible with phenolic resins and will cure when admixed with curable phenol-aldehyde resins. When cured at a temperature of 300°–325° F. for a period of about one-half hour, the resin forms an oil-resistant, alkali-resistant, heat-resistant, water-insoluble film; acid resistance is only fair. One of the outstanding advantages of the resin of the present invention is that it does not pass through a tacky stage during the curing cycle. This lack of tackiness is of special advantage in the preparation of filter felts.

A felt may be formed of a fibrous material in the usual manner. The resin of the present invention may be dissolved in water in a concentration of, for example, 15–20% by weight of resin. The felt may then be saturated with the resin solution and died; it is preferred that the pick-up should be about 35–45% by weight of the resin on a dry basis. After drying, the treated felt may be cured at a temperature of about 300°–325° F. until the desired cure is obtained. On cooling, the final felt will be found to be oil-resistant, water-resistant, and possess a good stiffness. The stiffness is obtained without affecting the porosity of the filter felt. Generally speaking, the cure of such a felt will take about one-half hour. Should this be too long a period of time, the water solution of the resin of the present invention may be admixed with a water solution of a phenol-aldehyde resin on a 1:1 resin basis. If a felt be treated with this resinous mixture and cured as described above, the period required for cure will be reduced to about 10 minutes, while at the same time the sheet during cure will not possess the detrimental tackiness found in sheets treated with phenol-aldehyde resins alone.

The structure of the polymer of the present invention is not known. It is postulated that the acrolein and the reducing sugar are condensed through acetal and ether linkages. Cure apparently proceeds through the formation of additional ether linkages since water is evolved during cure.

The following examples illustrate several embodiments of the invention. All parts are by weight unless otherwise stated.

*Example I*

Into a 2 liter flask there is placed 540.6 parts (3.0 moles) dextrose, 3 parts oxalic acid, 900 parts water, and 224.4 parts (4.0 moles) acrolein itself. This reaction mixture contains 54% by weight water. A reflux condenser is attached and the solution is refluxed for 4 hours at 56°±5° C., after which the temperature is raised to 65°±5° C. and reflux is continued for an additional 20 hours.

At the end of that time the excess water is distilled off at 65° C. under the vacuum obtained from a water aspirator with nitrogen bubbling through the reaction mass. The condensation product weighed 665 parts for a theoretical yield of 93%.

Subsequently the product was poured into pans and cooled. A hard, sticky, golden yellow resin resulted. After cure for two hours at 250° F., a hard, infusible, insoluble film resulted, having a rough surface.

*Example II*

A mixture of 105.0 parts water, 63.02 parts (0.35 mole) dextrose, 26.18 parts (0.465 mole) acrolein, and 0.35 part oxalic acid is heated to reflux and maintained at reflux for 4 hours. This reaction mixture contains 54% by weight water. Subsequently the reflux temperature was increased to 66° C. and reflux was continued for an additional 20 hours.

The water was then removed at a temperature of 65°

C. under the vacuum of a water aspirator with nitrogen. The product was then poured into pans and cooled.

On curing for two hours at 250° F., a resin substantially identical to that obtained in Example I resulted.

*Example III*

A mixture of 63.07 parts (0.350 mole) dextrose, 35.14 parts (0.626 mole) acrolein, 105.0 parts water, and 0.35 part oxalic acid was heated as in Examples I and II to form a resinous product. This reaction mixture contains 52% by weight water. Subsequently water was distilled out in the absence of nitrogen under the vacuum obtained at about 100° C. by a vacuum water aspirator. On cooling, the product was found to be a soft, sticky, black gum.

*Example IV*

A mixture of 126.14 parts (0.70 mole) dextrose, 40.0 parts (0.714 mole) acrolein, 60 parts water, 155 parts dioxane, and .70 gram oxalic acid was treated as in Example III. This reaction mixture contains 16% by weight water.

A thick, sticky liquid resulted; no resin formation such as was obtained in the preceding examples was noted.

The liquid was cast on a plate and cured for 2 hours at 250° F., whereupon there was formed a dark, hard, infusible, but soluble resin.

*Example V*

A mixture of 126.14 parts (0.70 mole) dextrose, 65.20 parts (1.16 moles) acrolein, 60 parts water, 155 parts dioxane, and .70 part oxalic acid was treated as in Example III. This reaction mixture contains 15% by weight water.

The product was a hard, sticky, golden yellow gum. This polymer was protected from air during removal of the excess acrolein by a nitrogen blanket.

On curing for 2 hours at 250° F., a hard, colorless, infusible, insoluble film resulted.

*Example VI*

A mixture of 126.14 parts (0.70 mole) dextrose, 65.20 parts (0.93 mole) crotonaldehyde, 60 parts water, 155 parts dioxane, and 0.70 part oxalic acid was refluxed at 100° C. for 24 hours. This reaction mixture contains 15% by weight water.

After removal of the water and solvent, a thick, yellow, balsam-like polymer resulted, which darkens on curing. After curing for 2 hours at 250° F., a hard, insoluble, infusible film resulted, after passing through a rubbery stage.

*Example VII*

A mixture of 126.14 parts (0.70 mole as dextrose: fructose, 1:1) sucrose, 52.32 parts (0.935 mole) acrolein, 60 parts water, 155 parts dioxane, and 0.70 part oxalic acid was treated as in Example III, followed by the usual water removal with nitrogen. This reaction mixture contains 15% by weight water.

The resultant resin was similar to the resin obtained in Example II. On curing for 2 hours at 250° F., the resin foamed slightly during curing to form a thermoset, colorless, infusible, soluble polymer.

We claim:

1. A resinous water-soluble thermosetting reaction product of substantially equivalent amounts of a reducing sugar and an alpha beta unsaturated aldehyde selected from the group consisting of acrolein, alpha-substituted acrolein, and beta-substituted acrolein, said alpha and beta substituents being selected from the group consisting of alkyl and aryl groups, prepared under acidic conditions in a pH range of about 1-3, in a reaction mixture containing at least 15% by weight water based on the total weight of said reaction mixture.

2. A reaction product according to claim 1 wherein said reducing sugar comprises dextrose.

3. A reaction product according to claim 1 wherein said reducing sugar comprises fructose.

4. A reaction product according to claim 1 wherein said reducing sugar comprises invert sugar.

5. A reaction product according to claim 1 wherein said aldehyde comprises crotonaldehyde and said reducing sugar comprises dextrose.

6. The thermoset resin of claim 1.

7. The method of making a polymeric reaction product which comprises forming a reaction mixture containing reducing sugar, an alpha beta unsaturated aldehyde selected from the group consisting of acrolein, alpha-substituted acrolein, and beta-substituted acrolein, said alpha and beta substituents being selected from the group consisting of alkyl and aryl groups, sufficient acid to produce a pH in said reaction mixture in the range of about 1-3, and at least 15% by weight water based on the total weight of said reaction mixture, and heating said reaction mixture to produce the resinous, water-soluble, thermosetting reaction product of said aldehyde and said reducing sugar, said aldehyde and said reducing sugar being present in substantially equivalent amounts.

8. The method according to claim 7 wherein said aldehyde is acrolein and said reducing sugar is dextrose.

9. The method according to claim 7 wherein said reaction mixture also contains a water-miscible solvent for said aldehyde.

10. The method according to claim 7 wherein said heating step is carried out at the reflux temperature of said reaction mixture.

11. The method according to claim 7 wherein said pH is about 1.8.

References Cited in the file of this patent

UNITED STATES PATENTS

| 1,949,831 | Ford | Mar. 6, 1934 |
| 1,974,064 | Ford | Sept. 18, 1934 |
| 2,401,776 | Rothrock | June 11, 1946 |

OTHER REFERENCES

"Acrolein," Shell Report No. S-13, 149, supplement to S-9, 941 page 2, C 1. (Copy in Division 64.)

Bredereck: "Kohlenhydrate und Furfurol," Berichte, JG 68 Juli-Dez (1935), page 2302.